United States Patent [19]

Chung

[11] Patent Number: 4,704,231

[45] Date of Patent: Nov. 3, 1987

[54] LOW-DENSITY GRAPHITE-POLYMER ELECTRICAL CONDUCTORS

[76] Inventor: Deborah D. L. Chung, 3812 Henley Dr., Pittsburgh, Pa. 15235

[21] Appl. No.: 612,406

[22] Filed: May 21, 1984

[51] Int. Cl.$^4$ ............................................. H01B 1/06
[52] U.S. Cl. .................................... 252/511; 524/495; 524/496; 264/105; 264/331.11; 264/331.15
[58] Field of Search ............... 252/502, 503, 506, 511; 264/105, 29.1, 331.11, 331.15; 524/495, 496

[56] References Cited

U.S. PATENT DOCUMENTS

| | | | |
|---|---|---|---|
| 1,137,373 | 4/1915 | Aylsworth | 252/511 |
| 1,191,383 | 7/1916 | Aylsworth | 264/29.1 |
| 3,404,061 | 10/1968 | Shane et al. | 428/64 |
| 3,409,563 | 11/1968 | Olstowski | 252/506 |
| 4,414,142 | 11/1983 | Voget et al. | 252/506 |
| 4,461,719 | 7/1984 | Voget et al. | 252/506 |

*Primary Examiner*—Josephine L. Barr

[57] ABSTRACT

This invention relates to composites comprising exfoliated graphite flakes in a polymer matrix which constitutes a small volume fraction; the density of the composite is 0.7 g/cm$^3$ or below and the electrical resistivity of the composite is 0.5 ohm.cm or below. This invention also relates to composites comprising exfoliated graphite flakes bound by a polymer, such that the flakes are preferentially oriented. In addition, this invention relates to a process for producing these composites.

6 Claims, No Drawings

LOW-DENSITY GRAPHITE-POLYMER ELECTRICAL CONDUCTORS

Graphite is a form of carbon consisting of layers of atoms. The bonding is strong between atoms of the same layer, and is weak between atoms of different layers. The electrical conductivity and thermal conductivity are much higher along directions in the plane of the layers than the direction (c-axis) perpendicular to the layers. By exposing graphite to an appropriate chemical reagent, which is known as the intercalate, the intercalate goes into the graphite and occupies the spaces between the carbon layers. The resulting material, known as intercalated graphite or a graphite intercalation compound, consists of carbon layers and intercalate layers stacked on top of one another in a periodic fashion. For example, the stacking can be of the form C-C-I-C-C-I-C-C-I-C, where C stands for a carbon layer and I stands for an intercalate layer. The number of carbon layers between nearest intercalate layers is known as the stage, which can be 1, 2, 3, 4, etc. The above example is for stage 2.

Upon heating intercalated graphite to a sufficiently high temperature, exfoliation occurs. Exfoliation refers to the sudden increase in the dimension perpendicular to the carbon layers. This process had been performed in graphite flakes (U.S. Pat. Nos. 1,191,383; 3,404,061) and pyrolytic graphite (U.S. Pat. No. 3,404,061).

Exfoliated graphite flakes can be formed by intercalating graphite flakes with an intercalate such as nitric acid and subsequently heating the intercalated flakes to about 600° C. or higher. For example, intercalation can be performed by immersing graphite flakes in red fuming nitric acid for a day or more. Although this procedure is not the same as that described in U.S. Pat. No. 1,191,383, it is quite similar to that described there.

After exfoliation, the graphite flakes have been irreversibly expanded by dozens to hundreds of times along the c-axis, which is the axis perpendicular to the carbon layers. In this condition, a flake resembles a worm with its long dimension along the c-axis. An exfoliated graphite flake is therefore also referred to as a worm.

This invention is not concerned with the formation of the exfoliated graphite, but rather is concerned with the formation of composites containing exfoliated graphite flakes. In particular, the present invention relates to a low-density graphite-polymer electrically conducting material, which comprises exfoliated graphite flakes (U.S. Pat. No. 1,191,383) and a small volume fraction of a polymer. Due to the high volume fraction of graphite and the low density of exfoliated graphite flakes (0.005–0.05 g/cm$^3$, U.S. Pat. No. 3,409,563), this composite has a density of 0.7 g/cm$^3$ or below and an electrical resistivity of 0.5 ohm.cm or below. The density, in particular, is 60% (or less) of the density of the polymer, which is a polyester in the example provided. The higher is the volume fraction of graphite, the lower is the density and the lower is the electrical resistivity. In contrast, the density of composites comprising unexfoliated graphite (including pristine graphite, and intercalated but unexfoliated graphite) increases with increasing volume fraction of graphite because of the relatively high density of unexfoliated graphite. Therefore, the density of the composite of this invention is lower than those of composites comprising unexfoliated graphite (U.S. Pat. No. 4,414,142).

Composites comprising exfoliated graphite had been described in U.S. Pat. No. 1,137,373. The material of the present invention is an improvement of the material of Claim No. 5 of U.S. Pat. No. 1,137,373. The material improvement is enabled by (i) the availability of thermoplasts and (ii) the development of an improved process. The material of this invention differs from that of Claim No. 5 of U.S. Pat. No. 1,137,373 in that (i) the binding material does not require heating (i.e., the binding material is not necessarily a thermoset), (ii) the composite is textured (i.e., with preferred orientation) such that the c-axes of the graphite flakes are preferentially parallel, and (iii) the volume fraction of graphite in the composite is higher. Although U.S. Pat. No. 1,137,373 does not give any value for the density or the electrical resistivity, the above differences (the second and third) imply that the material of the present invention has a lower density and a lower electrical resistivity than that of U.S. Pat. No. 1,137,373. The present invention provides values of the density and the electrical resistivity.

A principal object of this present invention is to provide a moldable low-density graphite-polymer electrical conductor. I have demonstrated that the electrical resistivity of the composite of this invention is sufficiently low for use in applications such as an electromagnetic interference shielding material. The uniqueness of this conductor lies in its exceptionally low density.

Another project of this invention is to provide a textured (or oriented) composite of exfoliated graphite flakes and a polymer, such that the electrical conductivity is enhanced along a particular direction of the composite. Textured (or oriented) composites of exfoliated graphite flakes and a polymer have not been previously reported.

Other objects of the invention will in part be obvious and will in part appear hereinafter.

These and other objects are achieved by the present invention which is directed to a low-density conductive composite comprising exfoliated graphite flakes and a polymer matrix, and to a process for making the same.

A primary requirement concerning the binding material is that it wets the graphite so that it thoroughly coats the surfaces of the exfoliated graphite flakes, thereby binding the flakes together upon setting. For example, silicone does not wet the graphite well, thus resulting in a composite with poor mechanical integrity.

A second requirement is that possible reactions between the intercalate (such as nitric acid) and the polymer do not hinder the setting of the composite or other characteristics of the composites. For example, reaction between nitric acid and urethane was found to prevent the setting of the graphite-urethane composite, in spite of the small amount of nitric acid in the exfoliated graphite flakes. (Exfoliation is known to cause desorption of the intercalate. See, for example, J. S. Culik and D. D. L. Chung, Mater. Sci. Eng. 44, 129 (1980).)

An example of a binding material which satisfies the above two requirements is the polyester laminating resin which sets at room temperature after the addition of a small amount of the hardener. For 1 fluid oz. of the resin, 4 drops of the hardener are required. The time needed for complete setting is several hours.

An example of the material of this invention was made by subjecting a suspension of exfoliated graphite flakes in a polyester resin (with hardener) to centrifugation in a glass tube at 400 rpm for 1 min. The centrifugation causes the less density graphite to be near the top while the denser polyester was at the bottom of the tube. With proper choice of the speed of rotation of the centrifuge, a middle region containing exfoliated graphite flakes firmly bound together by a very small amount of the polymer was obtained after the polymer had set. The sample obtained was thus cylindrical.

X-ray diffraction using a Rigaku D/MAX II powder x-ray diffractometer system was carried out on a plane containing the cylindrical axis of the sample and on a plane perpendicular to the cylindrical axis. For the former plane, the graphite 100 and graphite 002 peaks were observed with about equal intensities. For the latter plane, the intensity of the graphite 002 peak was about three times that of the graphite 100 peak. This clearly shows that the composite is textured such that the c-axis of the graphite is preferentially along the cylindrical axis of the sample. In other words, the composity exhibits a fiber texture such that the fiber axis is along the cylindrical axis of the sample.

X-ray diffraction did not show the broad diffuse peak associated with the polyester. (That the polyester was indeed characterized by a broad diffuse peak had been separately confirmed by performing x-ray diffraction on a polyester sample). This indicates that the volume fraction of polyester in the composite is indeed very low.

The density was measured by (i) weighing the sample and (ii) calculating the volume of the sample by taking the dimensions with a micrometer. The density of pristine polyester was 1.11 g/cm$^3$, while that of the composite was 0.68 g/cm$^3$. Thus, the composite has a density equal to 61% of that of polyester.

The electrical resistivity was measured by using the four-probe method. Measurements were made in directions parallel and perpendicular to the fiber axis of the composite. The electrical resistivity was 0.48 ohm.cm parallel to the fiber axis and 0.78 ohm.cm perpendicular to the fiber axis. Hence, the electrical resistivity parallel to the fiber axis was 62% of that perpendicular to the fiber axis. In contrast, the electrical resistivity of pristine graphite is known to be about four orders of magnitude higher along the c-axis than perpendicular to the c-axis. The composite is thus nearly isotropic in electrical resistivity. The lower resistivity along the fiber axis is attributed to the lower density of particle (worm) boundaries along the fiber axis and the connectivity between the bent graphite layers in the exfoliated graphite.

Although the thermal conductivity has not been measured, the high electrical conductivity suggests a high thermal conductivity.

The above non-limiting examples are set forth only for the purpose of illustration.

Potential applications of the material of this invention include those as an electrical conductor, an electromagnetic interference shield, a thermal conductor, and others.

The scope of this invention is not limited to graphite flakes, but also encompasses other forms of graphite such as pyrolytic graphite.

Since certain changes may be made in the above products and processes without departing from the scope of the invention herein involved, it is intended that all matter contained in the above description should be interpreted as illustrative and not in a limiting sense.

What is claimed is:

1. A composition which comprises exfoliated graphite flakes in a polymer binder wherein the density of the composition does not exceed 0.7 g/cm$^3$ and the electrical resistivity of the composition does not exceed 0.5 ohm.cm.

2. A molding composition which comprises exfoliated graphite flakes in a polymer binder wherein the flakes are oriented in the binder such that their c-axes are in substantially parallel alignment.

3. A process for producing a low density electrically conductive molding composition which comprises the steps of:
    (a) combining exfoliated graphite flakes, a polyester laminating resin and a hardener to form a suspension;
    (b) centrifuging the resultant suspension and thereby orienting said flakes with their c-axes in substantially parallel alignment; and
    (c) allowing the resin to set.

4. The composition of claim 1 wherein the polymer binder is a polyester laminating resin.

5. The composition of claim 2 wherein the density of the composition does not exceed 0.7 g/cm$^3$ and the electrical resistivity does not exceed 0.5 ohm/cm.

6. The composition of claim 2 wherein the polymer binder is a polyester laminating resin.

* * * * *